Patented Dec. 10, 1946

2,412,376

UNITED STATES PATENT OFFICE 2,412,376

ELECTRICAL RESISTANCE ELEMENTS DURABLE AT HIGH TEMPERATURES AND PROOF AGAINST CHEMICAL ACTION, AND PROCESS OF MAKING SAME

Axel Richard Wejnarth, Stockholm, Sweden

No Drawing. Original application November 27, 1943, Serial No. 512,054. Divided and this application September 24, 1945, Serial No. 618,421. In Sweden October 20, 1942

7 Claims. (Cl. 201—76)

Resistance rods of silicon carbide have earlier been manufactured. However, in the said rods it has been necessary to take into consideration a decreasing resistance at rising temperature. In the manufacture of rods of the kind mentioned there are used a binding medium and an addition of free silicon, said component facilitating the sintering and, when used in an appropriate quantity, at the same time imparting to the rods a suitable electric conductivity. It has proved on one hand that such resistance elements are able to endure an annealing temperature of about 1400° C. only, after which their conductivity is changed and the rods are destroyed, and on the other hand that they are very easily deteriorated in respect of durability and electric conductivity when brought into contact with particles from furnace lining, and by the action of surrounding metallic vapors or oxides, sulphides which may be formed, and so on.

In the manufacture of resistance elements of the kind described by sintering silicon carbide that may have been pressed and having different fineness of grain other suitable components may be added either prior to the sintering process or be allowed to be formed during the said process in order to regulate in a suitable way the electric conductivity of the resistance element at different temperatures, increase its temperature of use and improve its resistance to ceramic stuffs, metals, metallic oxides or the like.

It is possible to use for such purpose carbides, nitrides, silicides and borides of difficultly fusible metals such as Be, Mo, W, Ti, V and Cr. For certain purposes it has proved suitable to have the mass contain also nitrides, silicides or borides of the less difficultly fusible metals, Mn, Fe, Ni and Co.

The said components having different electrical conductivity, which may vary with the temperature and in a certain component even may assume a positive as well as a negative coefficient of temperature within a certain range of temperature, there is a possibility of regulating, by means of one or more such components, the electric conductivity of the resistance element in a suitable way in relation to the silicon carbide contained in the mass.

According to the invention there may be added another carbide or silicide, but it is also possible to form a certain carbide and/or silicide by adding to the silicon carbide, before or during the sintering process, a suitable quantity of one or more metals or metal compound capable of reacting with silicon carbide while binding the added metal or metal from the added metal compound, and then heating the mixture to sintering at desired temperature. Instead of such absorbation of metal in the grate of the silicon carbide it is possible to form the desired compounds and/or mixtures of carbides and/or silicides by adding to the silicon carbide a mixture of metal or metal compound with a suitable quantity of carbon or silicon, preferably in a suitable mixing proportion. The silicides having, as a rule, lower melting points than the corresponding carbides and thus, usually already at rather low contents, causing an upper limitation of the temperature of the resistance element it appears a general wish to try to form more carbide than silicide.

Analogously it is possible either to add to the silicon carbide one or more nitrides, or borides, or to form the same, before or during the sintering process, of metal mixed with reducing agents by reaction with, for example, nitrogen, borax or other compounds reacting to form nitrides or borides, The many combinations with one or more of the respective compounds that may occur in connection with the manufacture of electrical resistance elements durable at high temperatures and proof against chemical action cannot be specified, but by way of example the following may be stated. In testing the relevant circumstances it has appeared, for example, that manganese, chromium and wolfram form lower melting silicides than carbides, but that the said compounds of chromium are more durable than those of manganese and wolfram but at the same time more easily conducting. A suitable combination of wolfram or of manganese, or of both of them, with silicon carbide containing chromium results in a lower average electric conductivity and, all according to the testing conditions, composed carbides and/or silicides form more durable resistance elements than an element with silicon carbide containing, for example, wolfram only. The conductivity of the carbides as well as that of the silicides of chromium increasing very strongly with rising temperature and the input of such a resistance element reaching its maximum already at 1300°–1400° C. this occurrence can be displaced toward higher temperatures or be eliminated by adding a suitable quantity of manganese or wolfram only or of both in combination. Analogously it is possible, by mixing in a suitable way, for example, the easily fusible chromium carbide and, for example, the very difficultly fusible titanic carbide, to obtain sintering of the resistance element at a relatively moderate or at a very high temperature, possibly higher than the decomposition temperature of the silicon carbide, and also, through suitable combinations, to stabilize the components to the usual temperature, which components are otherwise durable at higher temperatures only.

The invention relates more particularly to rod-shaped elements of various design and cross section, but is not restricted thereto. A product of the proposed composition sintered in some way or other can be crushed and used as a heat resisting medium in the form of grains or powder, and also in such state form resistance elements. Such a material can be applied to resistance elements of carbon or graphite as a protecting coating, which in itself forms a resistance element.

Nor is the invention restricted to elements consisting of the combinations of components set forth in the following claims but also all other possible combinations of two or more of the components with each other fall within the scope of the invention.

This application is a division of my application Serial Number 512,054, filed November 27, 1943, entitled "Process of manufacturing resistance elements durable at high temperature and proof against chemical action."

Having now described my invention, what I claim as new and desire to secure by Letters Patent is:

1. Electrical resistance element durable at high temperature and proof against chemical action, consisting of a sintered mass, containing as main component silicon carbide and, moreover, in smaller quantity, at least one compound, belonging to the group of chromium carbide, chromium nitride, chromium silicide and chromium boride, and at least one compound, belonging to the group of vanadium carbide, vanadium nitride, vanadium silicide and vanadium boride.

2. Electrical resistance element according to claim 1, the mass containing also at least one compound, belonging to the group of manganese nitride, manganese silicide and manganese boride.

3. Electrical resistance element according to claim 1, the mass containing also at least one compound, belonging to the group of iron nitride, iron silicide and iron boride.

4. Electrical resistance element according to claim 1, the mass containing also at least one compound, belonging to the group of nickel nitride, nickel silicide and nickel boride.

5. Electrical resistance element according to claim 1, the mass containing also at least one compound, belonging to the group of cobalt nitride, cobalt silicide and cobalt boride.

6. A process of making electrical resistance elements according to claim 1, adding to the silicon carbide, prior to the sintering, the compounds desired to be included in the finished product.

7. A process of making electrical resistance elements according to claim 1, adding to the silicon carbide components of the kind to form, during the sintering process, the compounds desired to be included in the finished product.

AXEL RICHARD WEJNARTH.